US009992418B2

(12) United States Patent
Kim et al.

(10) Patent No.: US 9,992,418 B2
(45) Date of Patent: Jun. 5, 2018

(54) APPARATUS AND METHOD FOR GENERATING PHOTOGRAPH IMAGE IN ELECTRONIC DEVICE

(71) Applicant: Samsung Electronics Co., Ltd., Gyeonggi-do (KR)

(72) Inventors: Kwang-Tai Kim, Gyeonggi-do (KR); Young-Kyoo Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days. days.

(21) Appl. No.: 14/292,207

(22) Filed: May 30, 2014

(65) Prior Publication Data

US 2015/0015762 A1 Jan. 15, 2015

(30) Foreign Application Priority Data

Jul. 12, 2013 (KR) .......................... 10-2013-0082455

(51) Int. Cl.
*H04N 5/232* (2006.01)
*H04N 5/225* (2006.01)

(52) U.S. Cl.
CPC ....... *H04N 5/23293* (2013.01); *H04N 5/2258* (2013.01); *H04N 5/23216* (2013.01); *H04N 5/23245* (2013.01)

(58) Field of Classification Search
CPC .......................... H04N 5/2258; H04N 5/23293
See application file for complete search history.

(56) References Cited

U.S. PATENT DOCUMENTS

| 7,443,447 | B2* | 10/2008 | Shirakawa | H04N 5/2251 348/262 |
| 8,330,866 | B2* | 12/2012 | Walker | H04H 20/26 348/565 |
| 8,866,943 | B2* | 10/2014 | Park | H04N 5/23222 348/139 |
| 8,953,079 | B2* | 2/2015 | Raju | H04N 5/2624 348/14.02 |
| 9,015,242 | B2* | 4/2015 | Dorso | H04L 65/1069 709/201 |
| 2007/0279482 | A1* | 12/2007 | Oswald | H04N 7/142 348/14.02 |
| 2009/0015703 | A1* | 1/2009 | Kim | G03B 29/00 348/333.12 |
| 2009/0295976 | A1* | 12/2009 | Choi | H04N 5/23293 348/333.11 |

(Continued)

FOREIGN PATENT DOCUMENTS

KR 10-2007-0117284 A 12/2007
KR 10-2011-0026783 A 3/2011

*Primary Examiner* — Amy Hsu
(74) *Attorney, Agent, or Firm* — The Farrell Law Firm, P.C.

(57) ABSTRACT

A method for generating a photograph image by using any of the preview images captured by multiple image sensors on the electronic device and displayed in a multi-preview mode on the device is provided. The method includes displaying a first preview image obtained from a first image sensor in a first preview area; displaying a second preview image obtained from a second image sensor in a second preview area; and upon detection of a predetermined first user input in the second preview area, generating a photograph image by using the second preview image.

18 Claims, 7 Drawing Sheets

(56) References Cited

U.S. PATENT DOCUMENTS

| | | | | |
|---|---|---|---|---|
| 2009/0298537 A1* | 12/2009 | Choi | H04M 1/72583 | 455/556.1 |
| 2010/0321534 A1* | 12/2010 | Kim | G06T 11/00 | 348/239 |
| 2011/0050976 A1* | 3/2011 | Kwon | H04N 5/23219 | 348/333.04 |
| 2011/0058051 A1* | 3/2011 | Jeon | G06F 3/012 | 348/211.11 |
| 2011/0300910 A1* | 12/2011 | Choi | G06F 3/0482 | 455/566 |
| 2011/0317031 A1* | 12/2011 | Honda | H04N 5/23219 | 348/229.1 |
| 2012/0105579 A1* | 5/2012 | Jeon | H04N 5/2258 | 348/38 |
| 2012/0113216 A1* | 5/2012 | Seen | H04N 5/23293 | 348/38 |
| 2012/0120186 A1* | 5/2012 | Diaz | H04N 5/2258 | 348/36 |
| 2012/0257025 A1* | 10/2012 | Kim | H04N 13/0497 | 348/51 |
| 2012/0274808 A1* | 11/2012 | Chong | H04N 5/23293 | 348/234 |
| 2013/0208127 A1* | 8/2013 | Chou | H04N 5/23216 | 348/169 |
| 2013/0235224 A1* | 9/2013 | Park | H04N 5/23222 | 348/218.1 |
| 2013/0314511 A1* | 11/2013 | Chen | H04N 5/23222 | 348/50 |
| 2013/0329060 A1* | 12/2013 | Yim | G06F 17/30244 | 348/207.1 |
| 2013/0329100 A1* | 12/2013 | Desai | H04N 5/2258 | 348/262 |
| 2014/0071323 A1* | 3/2014 | Yi | G06F 3/04883 | 348/333.01 |
| 2014/0118595 A1* | 5/2014 | Jung | H04N 5/23293 | 348/333.01 |
| 2014/0168470 A1* | 6/2014 | Yoshino | G06F 3/0488 | 348/231.7 |
| 2014/0232906 A1* | 8/2014 | Ha | H04N 5/265 | 348/239 |
| 2014/0232921 A1* | 8/2014 | Kim | H04N 5/23293 | 348/333.05 |
| 2014/0240469 A1* | 8/2014 | Lee | H04N 13/025 | 348/48 |
| 2014/0240579 A1* | 8/2014 | Park | G06F 3/0484 | 348/333.11 |

* cited by examiner

APPARATUS AND METHOD FOR GENERATING PHOTOGRAPH IMAGE IN ELECTRONIC DEVICE

PRIORITY

This application claims priority under 35 U.S.C. § 119(a) to a Korean Patent Application filed in the Korean Intellectual Property Office on Jul. 12, 2013 and assigned Serial No. 10-2013-0082455, the entire disclosure of which is incorporated herein by reference.

BACKGROUND OF THE INVENTION

1. Field of the Invention

The present invention relates generally to a method and apparatus for generating a photograph image in an electronic device.

2. Description of the Related Art

Many types of electronic devices, including smartphones, have emerged recently. These electronic devices are typically equipped with cameras, with many having both front and rear cameras. These devices thus far have not taken full advantage of this feature.

Figure 1:
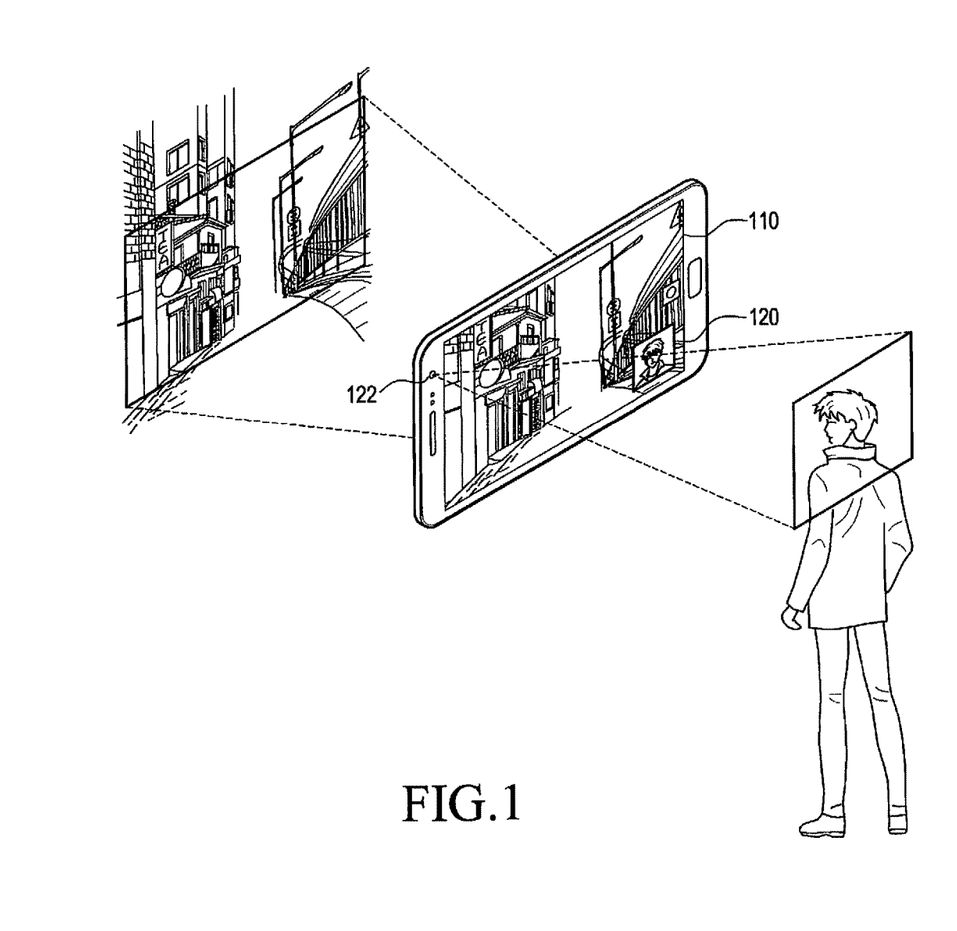
FIG. 1 illustrates how preview images are displayed in a multi-preview mode.

The electronic device has image sensors on the front and back to convert received light to a digital signal. In a preview mode, digital signals output from the image sensors are displayed in a display area of the electronic device as preview images. The electronic device may operate in single-preview mode or multi-preview mode. In single-preview mode, a preview image obtained from a single image sensor is displayed. In multi-preview mode, preview images obtained from both image sensors can be displayed in Picture-In-Picture (PIP) form, for example. This can be further explained with reference to FIG. 1. FIG. 1 illustrates how to display preview images in multi-preview mode. For example, as shown in FIG. 1, a preview image obtained from a single image sensor (not shown) is displayed in a first preview area 110, e.g., the entire display area, and another preview image obtained from another image sensor 122 is displayed in a second preview area 120, e.g., a partial display area. An electronic device equipped with two or more cameras, which may be in multi-preview mode, needs to switch to a single-preview mode in order to capture a second preview image. For the change to the single-preview mode, the electronic device requires the user to make multi-phase menu selections.

SUMMARY

The present invention has been made to address at least the above problems and/or disadvantages and to provide at least the advantages described below. Accordingly, an aspect of the present invention provides a method for using an electronic device to generate a photograph image by using any of the preview images captured from multiple image sensors on the device and being displayed in a "multi-preview" mode on the electronic device.

In accordance with an aspect of the present invention, a method for generating a photograph image in an electronic device is provided. The method includes displaying a first preview image obtained from a first image sensor in a first preview area; displaying a second preview image obtained from a second image sensor in a second preview area; and upon detection of a predetermined first user input in the second preview area, generating a photograph image by using the second preview image. In accordance with another aspect of the present invention, provides an apparatus for generating a photograph image in an electronic device is provided. The apparatus includes first and second image sensors; a display unit for providing first and second preview areas; a controller for displaying a first preview image obtained from the first image sensor in the first preview area; and, a controller for displaying a second preview image obtained from the second image sensor in the second preview area. Upon detection of a predetermined first user input in the second preview area, a photograph image is generated by using the second preview image.

BRIEF DESCRIPTION OF THE DRAWINGS

The above and other aspects, features and advantages of the present invention will become more apparent from the following detailed description taken in conjunction with the accompanying drawings, in which.

DETAILED DESCRIPTION OF EMBODIMENTS OF THE PRESENT INVENTION

Various embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The present invention will be described more fully hereinafter with reference to the accompanying drawings, in which illustrative embodiments of the invention are shown. This invention may, however, be embodied in many different forms and should not be construed as limited to the embodiments set forth herein. Rather, these embodiments are provided so that the description of this invention will be thorough and complete, and will fully convey the scope of the invention to those skilled in the art. The present invention will be defined by the appended claims.

Although ordinal numbers such as "first", "second", "third", etc., may be used to describe various elements, components, regions, layers and/or sections, these elements, components, regions, layers and/or sections should not be limited by these terms. These terms are only used to distinguish one element, component, region, layer or section from another. Thus, a first element, component, region, layer or section discussed below could be termed a second element, component, region, layer or section without departing from the teachings of the inventive concept. Descriptions shall be understood as to include any and all combinations of one or more of the associated listed items when the items are described by using the conjunctive term "and/or" or the like.

It is to be understood that the singular forms "a," "an," and "the" include plural references unless the context clearly dictates otherwise. It will be further understood that the terms "has", "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "electronic device" as used herein may refer to an apparatus capable of capturing images. The electronic device may include cell phones, smartphones, navigation devices, Personal Digital Assistants (PDAs), Portable Multimedia Players (PMPs), Moving Picture Experts Group Layer 3 (MP3) players, game consoles, tablets, netbooks, desktop computers, notebook computers, communication terminals with Internet connectivity, and communication terminals able to receive broadcast signals.

The term "multi-preview" mode as used herein refers to a mode used to display, in predetermined display areas on the device, a preview of images obtained from two or more image sensors located on the device. For example, in the multi-preview mode, an electronic device equipped with two image sensors would display a preview image obtained from one image sensor in the entire display area of the device and display another preview image obtained from the other image sensor in PIP form on the device. In another example of the multi-preview mode, the electronic device equipped with three or more image sensors would display a preview image obtained from one image sensor in the entire display area of the device and display other preview images obtained from the other image sensors in PIP form.

The term "single-preview" mode as used herein refers to a mode in which to display, in a predetermined display area on the device, a preview of a single image obtained from one of two or more image sensors located on the device.

Various embodiments of the present invention provide a method for generating a photograph image by using any of the preview images captured by multiple sensors on an electronic device and displayed in the device's multi-preview mode.

Various embodiments of the present invention will be described with reference to accompanying drawings.

Figure 2:
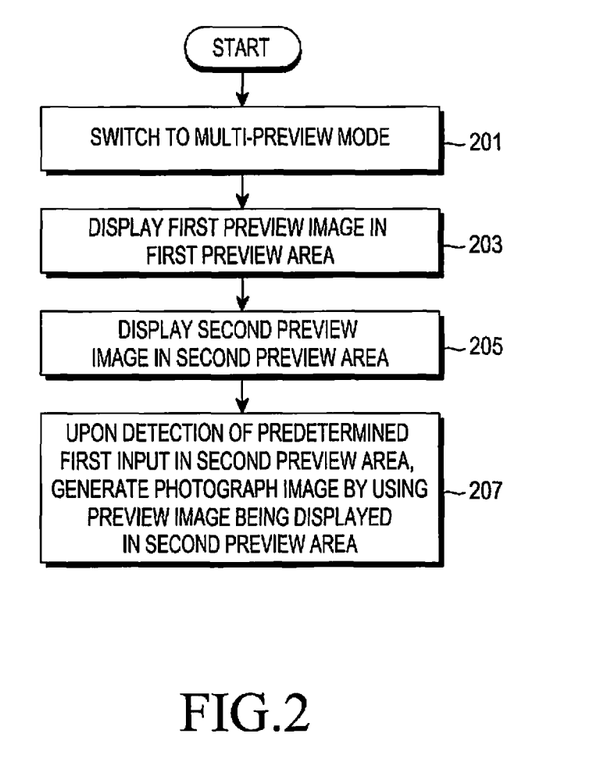
FIG. 2 is a flowchart illustrating a method for generating a photograph image, according to an embodiment of the present invention.

FIG. 2 is a flowchart illustrating a method for generating a photograph image, according to embodiments of the present invention. Referring to FIG. 2, an electronic device is assumed to have two image sensors. At least one of the steps described in FIG. 2 may be omitted depending on the circumstances under which the operator is using the invention.

In step 201, the electronic device enters the multi-preview mode. For example, the electronic device may automatically enter the multi-preview mode when running a selected application for photography. Alternatively, the electronic device may enter the multi-preview mode when a predetermined menu item is selected or a predetermined user input is detected in the single-preview mode.

In step 203, the electronic device displays a first preview image in a first preview area. The first preview image may be obtained from a first image sensor included in the electronic device. For example, the first image sensor may belong to a camera module that is equipped on the back of the electronic device. The first preview image may be obtained by capturing an object placed behind the electronic device. The first preview area may be, for example, the entire display area of the electronic device.

In step 205, the electronic device displays a second preview image in a second preview area. The second preview image may be obtained from a second image sensor included in the electronic device. For example, the second image sensor may belong to a camera module that is equipped on the front of the electronic device. The second preview image may be obtained by capturing an object placed in front of the electronic device. The second preview area may be, for example, a partial display area of the electronic device.

Figure 3:
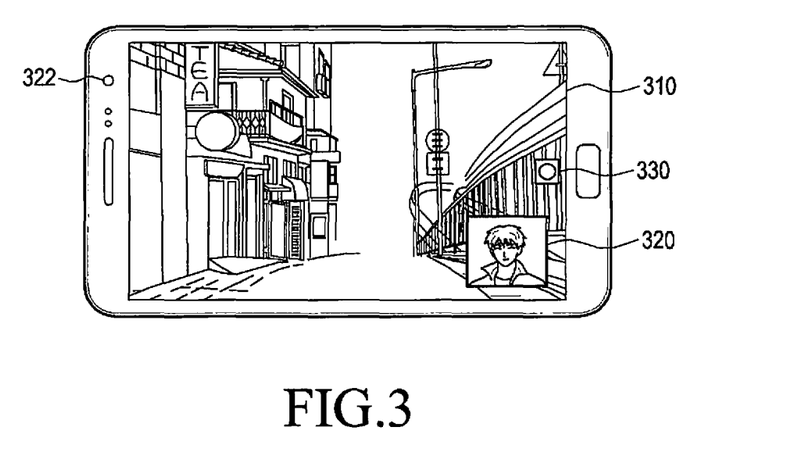
FIG. 3 illustrates a display screen of an electronic device in multi-preview mode, according to an embodiment of the present invention.

A display screen resulting from steps 203 and 205 will be described in connection with FIG. 3, which illustrates the display screen of the multi-preview mode, according to an embodiment of the present invention.

In a first preview area 310 of the electronic device, a first preview image is displayed. The first preview area 310 may be, for example, the entire display area of the electronic device, as illustrated. The first preview image may be obtained from an image sensor (not shown) of the camera module equipped on the back of the electronic device.

In a second preview area 320 of the electronic device, a second preview image is displayed. The second preview area 320 may be, for example, a partial display area of the electronic device, as illustrated. The second preview image may be displayed in PIP form. The second preview image may be obtained from an image sensor (not shown) of the camera module 322 equipped on the front of the electronic device. Alternatively, the second preview image may be displayed in the first preview area 310 and the first preview image may be displayed in the second preview area 320.

Additionally, the electronic device may present various menus in a predetermined display area. For example, the electronic device may display a menu 330 for photography in a predetermined display area. Upon selection of the menu 330, the electronic device may generate a photograph image by using the first preview image and/or the second preview image.

Turning back to FIG. 2, in step 207, upon detection of a predetermined first input in the second preview area, the electronic device may generate a photograph image by using the preview image being displayed in the second preview image. The photograph image may then be stored in a memory. For example, while the first and second preview images are displayed in the first and second preview areas, respectively, upon detection of the predetermined first input in the second preview area, the electronic device may generate the photograph image by using the second preview image. This will be described with reference to FIG. 4.

Figure 4:
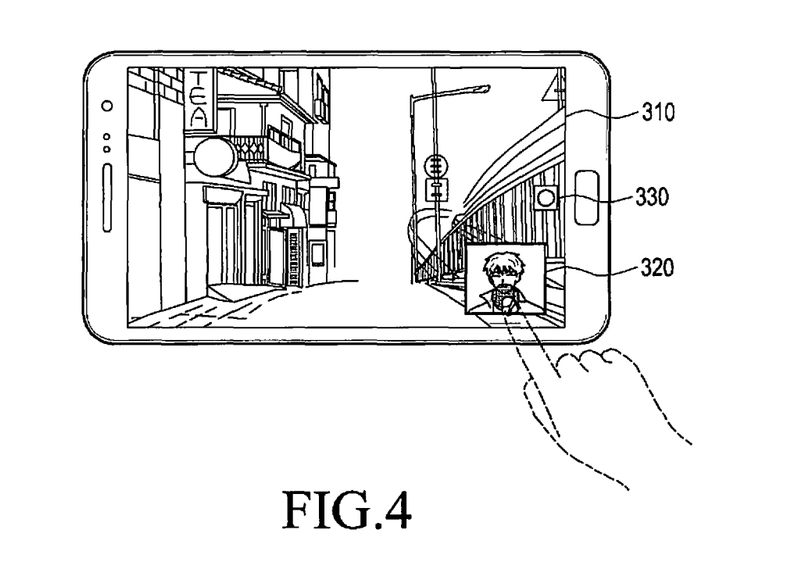
FIG. 4 illustrates how to generate a photograph image by using a preview image being displayed in a second preview area, according to an embodiment of the present invention.

FIG. 4 illustrates how to generate a photograph image by using a preview image being displayed in a second preview area, according to an embodiment of the present invention. Referring to FIG. 4, while first and second preview images are displayed in the first and second preview areas 310 and 320, respectively, upon detection of a predetermined first input, e.g., the user's touch gesture in the second preview area 320, the electronic device may generate the photograph image by using the second preview image being displayed in the second preview area 320.

Alternatively, for example, while first and second preview images are displayed in the second and first preview areas, respectively, upon detection of the predetermined first input in the second preview area, the electronic device may generate the photograph image by using the first preview image. The predetermined first input may be, for example, one of touching, double touching, triple touching, swiping, or pinching.

In another embodiment, upon detection of a user input in the second preview area, the electronic device may display predetermined menus in a predetermined display area, rather than generate a photograph image by using the preview image being displayed in the second preview area. This will be described with reference to FIGS. 5A to 5C.

Figure 5A:
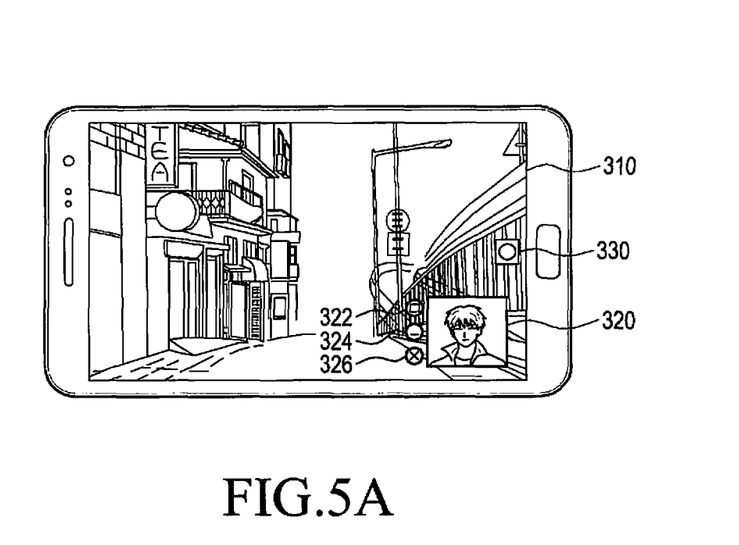
FIGS. 5A to 5C illustrate screens in which predetermined menus are displayed upon detection of user inputs, according to an embodiment of the present invention.

FIGS. 5A to 5C illustrate screens in which predetermined menus are displayed upon detection of user inputs, according to an embodiment of the present invention. For example, upon detection of a predetermined second user input in the second preview area 320, the electronic device may display, as shown in FIG. 5A, at least one menu in a predetermined display area. The predetermined display area to display the menu may be adjacent to the second preview area 320. The second user input may be, for example, one of touching, double touching, triple touching, swiping, or pinching. The second user input may also be a hovering gesture that approaches the second preview area 320. The hovering gesture may be detected using a hovering technology. The at least one menu may include menu 322 for generating a photograph image and menus 324 and 326 for switching to the single-preview mode.

Upon selection of the menu 322 for generating a photograph image, the electronic device may generate a photograph image by using the preview image being displayed in the second preview area 320.

Figure 5B:
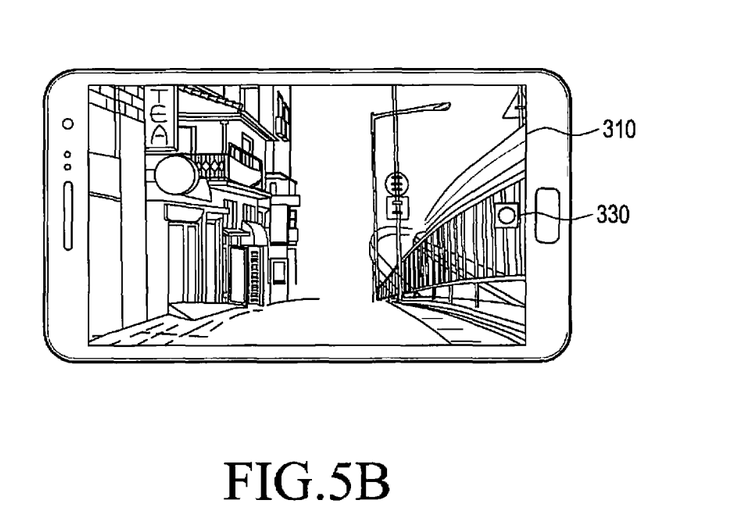

Upon selection of the menu 326 for switching to the single-preview mode, the electronic device may switch to the single-preview mode. While switching to the single-preview mode, the electronic device may stop displaying the preview image in the second preview area 320, as illustrated in FIG. 5B.

Figure 5C:
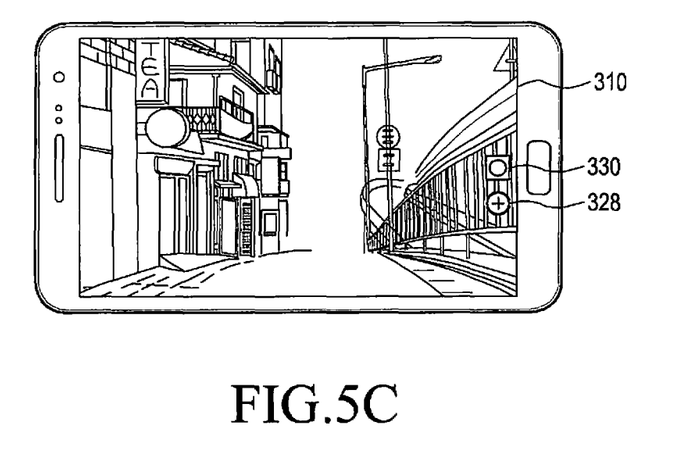

Upon selection of the menu 324 for switching to the single-preview mode, the electronic device may switch to the single-preview mode. While switching to the single-preview mode, the electronic device may stop displaying the preview image in the second preview area 320, as illustrated in FIG. 5C. In the single-preview mode, the electronic device may display a menu in the display area. For example, the electronic device may display a menu 328 for displaying the preview image that was being displayed back in the second preview area 320 at a predetermined position of the display area. Upon selection of the menu 328, the electronic device may display the preview image that was being displayed back in the second preview area 320.

Upon detection of a predetermined user input in a multi-preview mode, the electronic device may also switch to the single-preview mode. This will be described with reference to FIGS. 6A to 6D.

Figure 6A:
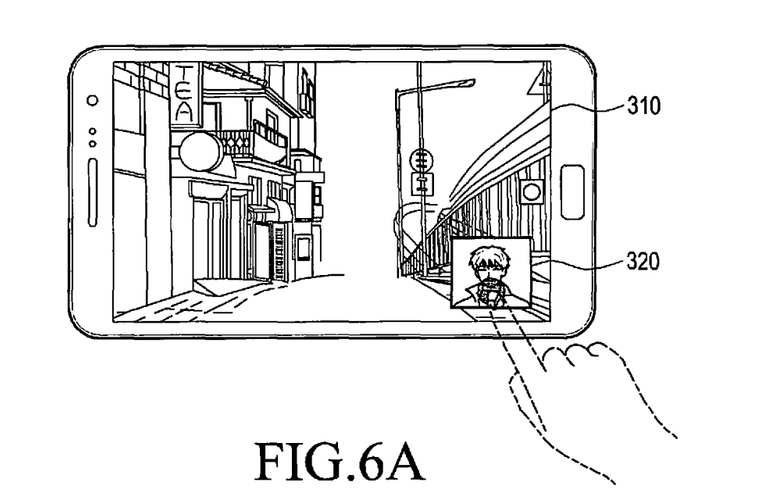
FIGS. 6A to 6D illustrate changes in photography mode, according to an embodiment of the present invention.
Figure 6B:
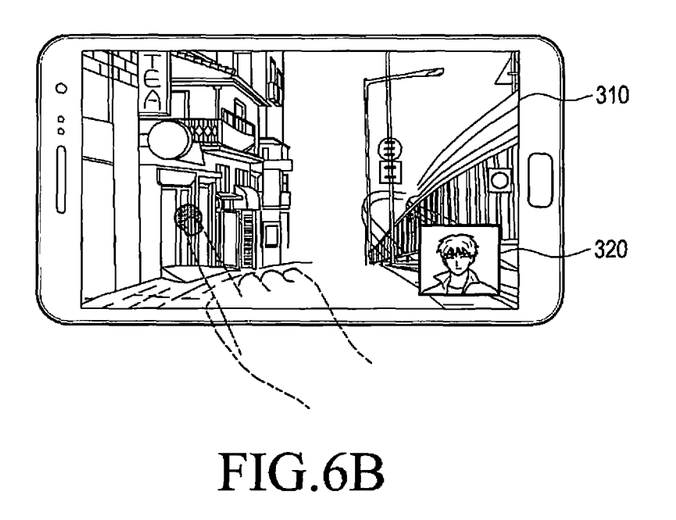
Figure 6C:
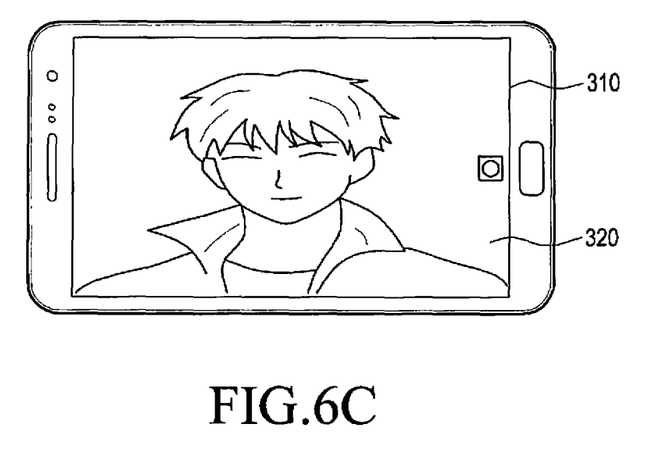
Figure 6D:
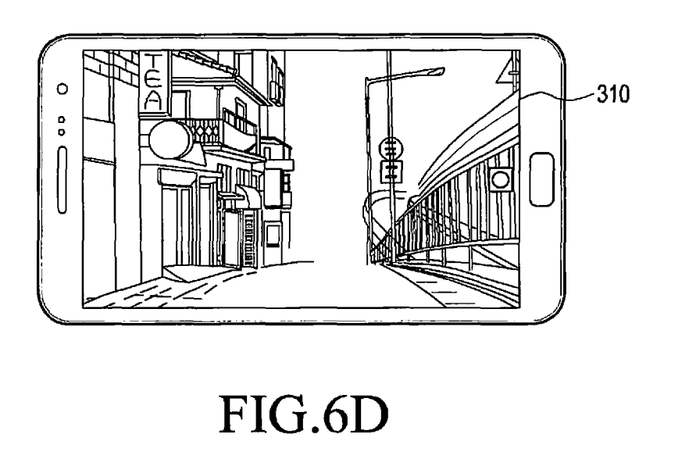

FIGS. 6A to 6D illustrate changes in photography mode, according to an embodiment of the present invention. For example, as shown in FIG. 6A, upon detection of a predetermined third user input in the second preview area 320, the electronic device may switch to the single-preview mode. Specifically, upon detection of the third user input in the second preview area 320, the electronic device displays the preview image that has been displayed in the second preview area 320 in the first preview area 310, as shown in FIG. 6C. Alternatively, upon detection of the third user input in the second preview area 320, the electronic device may stop displaying the preview image in the second preview area 320, as shown in FIG. 6D.

In another embodiment, for example, as shown in FIG. 6B, upon detection of the third user input in the first preview area 310, the electronic device may switch to the single-preview mode. In the single-preview mode, the electronic device may stop displaying one preview image while displaying the other preview image in the first preview area 310, as shown in FIGS. 6A to 6C. The third input may be, for example, one of touching, double touching, triple touching, swiping, or pinching.

In the meantime, upon detection of a predetermined user input in a single-preview mode, the electronic device may switch to the multi-preview mode. For example, upon detection of a predetermined fourth user input in the first preview area 310 in the single-preview mode, the electronic device may switch back to the multi-preview mode.

Specifically, in the single-preview mode as illustrated in FIGS. 6C and 6D, upon detection of the fourth user input in the first preview area 310, the electronic device switches to the multi-preview mode as shown in FIG. 6A or 6D. The fourth input may be, for example, one of touching, double touching, triple touching, swiping, or pinching.

The aforementioned user inputs to be used in a given electronic device may vary from each other when multiple user inputs are used. For example, if the first and second user inputs are to be used, the first user input may be a touch gesture while the second user input may be a hovering gesture. In another example, if the first to third user inputs are to be used, the first user input may be a double-touch gesture, the second user input a hovering gesture, and the third user input a touch gesture. In yet another example, if the first to fourth user inputs are to be used, the first user input may be a triple-touch gesture, the second user input a hovering gesture, the third user input a double-touch gesture, and the fourth user input a touch gesture.

Figure 7:
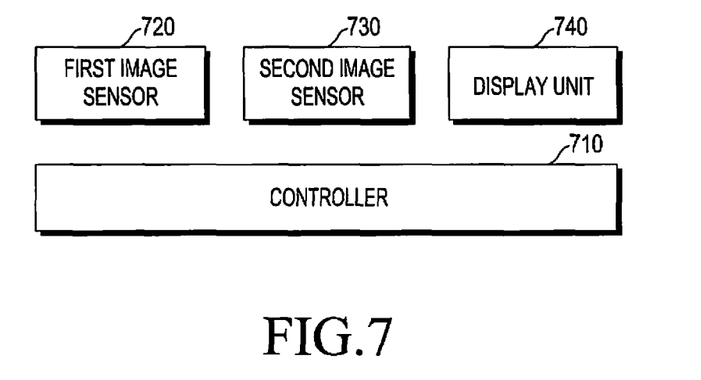
FIG. 7 is a block diagram illustrating an electronic device, according to various embodiments of the present invention.

FIG. 7 is a block diagram illustrating an electronic device, according to embodiments of the present invention.

Referring to FIG. 7, the electronic device includes a controller 710, a first image sensor 720, a second image sensor 730, and a display unit 740. At least one of the components may be omitted depending on the configuration required for the electronic device's particular use. While the electronic device is assumed herein to have two image sensors, various embodiments may also be applied to an electronic device having three or more image sensors.

The first image sensor 720 and the second image sensor 730 convert incident light to a digital signal. The digital signal is displayed in the display unit 740 as a preview image. For example, a preview image obtained from the first image sensor 720 may be displayed in a first preview area while a preview image obtained from the second image sensor 730 may be displayed in a second preview area. In another example, a preview image obtained from the first image sensor 720 may be displayed in the second preview area while a preview image obtained from the second image sensor 730 may be displayed in the first preview area. The first image sensor 720 may be placed on the front or the back of the electronic device, for example. With the first image sensor 720 placed on the front of the electronic device, the second image sensor 730 may be placed on the back of the electronic device. Alternatively, with the second image sensor 730 placed on the front of the electronic device, the first image sensor 720 may be placed on the back of the electronic device.

The display unit 740 displays the first preview area and/or the second preview area. The first preview area may occupy, for example, the entire display area. The second preview area may occupy up, for example, a partial display area.

The controller 710 may display the first preview image obtained from the first image sensor 720 in the first preview area and display the second preview image obtained from the second image sensor 730 in the second preview area. Upon detection of a predetermined first user input in the second preview area, the controller 710 may generate a photograph image by using the second preview image.

Upon detection of a predetermined second user input in the second preview area, the controller 710 may display a menu for generating a photograph image and/or menus for switching to the single-preview mode in a predetermined display area. Upon detection of the predetermined second user input in the second preview area, the controller 710 may display a menu for generating a photograph image and/or menus for switching to the single-preview mode in a predetermined display area. If the user selects the menu for switching to the single-preview mode, the controller 710 may stop displaying the second preview image. In this case, the controller 710 may also display a menu in a predetermined display area for bringing back the second preview image to the second preview area.

Also, upon detection of a predetermined third user input in the first or second preview areas, the controller 710 may switch to the single-preview mode. While switching to the single-preview mode, the controller 710 may stop displaying the first preview image and display the second preview image in the first preview area. In some embodiments, while switching to the single-preview mode, the controller 710 stops displaying the second preview image.

In the single-preview mode, upon detection of a predetermined fourth user input in the first preview area, the controller 710 may switch to the multi-preview mode.

According to various embodiments of the present invention, a photograph image may be conveniently generated. Also, according to various embodiments of the present invention, a photography mode may be conveniently controlled.

The foregoing embodiments of the present invention may be implemented through various methods. For example, the embodiments of the present invention may be implemented in hardware, software, or a combination thereof. When implemented in software, the embodiments may be implemented with instructions, executable by one or more processors with various operating systems or platforms. Additionally, the software may be written in any number of programming languages, and/or may be compiled into machine-executable assembly language codes or intermediate codes, which are executed on a framework or a virtual machine.

Furthermore, the embodiments of the present invention may be implemented on processor-readable media (e.g., memories, floppy discs, hard discs, compact discs, optical discs, or magnetic tapes) having one or more programs embodied thereon for carrying out, when executed by one or more processors, the method of implementing embodiments of the present invention discussed above.

While several embodiments have been described in connection with e.g., mobile communication terminals, a person of ordinary skill in the art will understand and appreciate that various changes in form and details may be made therein without departing from the spirit and scope of the present invention as defined by the following claims and their equivalents.

What is claimed is:

1. A method for generating a photograph image in an electronic device, the method comprising:
   displaying a first preview image and a second preview image in a multi-preview mode, wherein the first preview image is obtained from a first image sensor and is displayed in a first preview area and the second preview image is obtained from a second image sensor is displayed in a second preview area;
   upon detection of a predetermined first user input in the second preview image while displaying the first preview image and the second preview image in the multi-preview mode, generating a photograph image by using the second preview image; and
   upon detection of a predetermined second user input in the first preview area or the second preview area in the multi preview mode, switching the multi-preview mode to a single-preview mode.

2. The method of claim 1, further comprising:
   upon detection of a predetermined third user input in the second preview area, displaying a menu for generating the photograph image and menus for switching the multi-preview mode to the single-preview mode.

3. The method of claim 2, further comprising:
   upon selection of the displayed menu for generating the photograph image, generating the photograph image by using the second preview image.

4. The method of claim 2, further comprising:
   upon selection of a menu of the displayed menus for switching to the single-preview mode, stopping display of the displayed second preview image.

5. The method of claim 4, further comprising:
   upon switching to the single-preview mode, displaying a menu for again displaying the second preview image in the second preview area.

6. The method of claim 1, wherein when the predetermined second user input is detected in the displayed second preview image in the multi-preview mode, switching the multi-preview mode to the single-preview mode comprises:
   stopping display of the first preview image; and
   displaying the second preview image in the first preview area.

7. The method of claim 1, wherein when the third predetermined third user input is detected in the first preview image in the multi-preview mode, switching the multi-preview mode to the single-preview mode comprises:
   stopping display of the second preview image.

8. The method of claim 1, further comprising:
   upon detection of a predetermined fourth user input in the first preview area while in the single-preview mode, switching the single-preview mode to the multi-preview mode.

9. An apparatus for generating a photograph image, the apparatus comprising:
   a first sensor and a second image sensor;
   a display unit configured to provide a first preview area and a second preview area; and
   a controller configured to:
      display a first preview image and a second preview image in a multi-preview mode, wherein the first preview image is obtained from the first image sensor and is displayed in the first preview area and the second preview image is obtained from the second image sensor and is displayed in the second preview area, upon detection of a predetermined first user input in the second preview image while the first preview image and the second preview image are displayed in the multi-preview mode, generate a photograph image by using the second preview image, and upon detection of a predetermined second user input in the first preview area or the second preview area in the multi-preview mode, switch the multi-preview mode to a single preview mode.

10. The apparatus of claim 9, wherein the controller is further configured to, upon detection of a predetermined third user input in the second preview area, display a menu for generating the photograph image and menus for switching the multi-preview mode to the single-preview mode.

11. The apparatus of claim 10, wherein the controller is further configured to, upon selection of the displayed menu for generating the photograph image, generate the photograph image by using the second preview image.

12. The apparatus of claim 10, wherein the controller is further configured to, upon selection of a menu of the displayed menus for switching to the single-preview mode, stop displaying the displayed second preview image.

13. The apparatus of claim 12, wherein the controller is further configured to upon switching to the single-preview mode, display a menu for displaying again the second preview image in the second preview area.

14. The apparatus of claim 9, wherein if the predetermined second user input is detected in the displayed second preview image in the multi-preview mode, the controller is further configured to step displaying the first preview image and displays the second preview image in the first preview area while switching the multi-preview mode to the single-preview mode.

15. The apparatus of claim 9, wherein if the predetermined second user input is detected in the first preview image in the multi-preview mode, the controller is further configured to stop displaying the second preview image while switching the multi-preview mode to the single-preview mode.

16. The apparatus of claim 9, wherein the controller is further configured to, upon detection of a predetermined fourth user input in the first preview area while in the single-preview mode, switch the single-preview mode to the multi-preview mode.

17. A method for generating a photograph image in an electronic device, the method comprising:

displaying a first preview image and a second preview image in a multi-preview mode, wherein the first preview image is obtained from a first image sensor and is displayed in a second preview area and the second preview image is obtained from a second image sensor and is displayed in a first preview area;

upon detection of a predetermined first user input in the first preview image displayed in the second preview area while displaying the first preview image and the second preview image in the multi-preview mode, generating a photograph image by using the first preview image; and upon detection of a predetermined second user input in one of the first preview area and the second preview area while the first preview image and the second preview image are displayed in the multi-preview mode, switching to a single-preview mode.

18. An apparatus for generating a photograph image, the apparatus comprising:

a first sensor and a second image sensor;

a display unit configured to provide a first preview area and a second preview area; and a controller configured to:

display a first preview image and a second preview image in a multi-preview mode, wherein the first preview image is obtained from the first image sensor and is displayed in the second preview area and the second preview image is obtained from the second image sensor and is displayed in the first preview, area, upon detection of a predetermined first user input in the first preview image displayed in the second preview area while the first preview image and the second preview image are displayed in the multi-preview mode, generate a photograph image by using the first preview image; and upon detection of a predetermined second user input in one of the first preview area and the second preview area in the multi-preview mode, switch the multi-preview mode to a single-preview mode.

* * * * *